United States Patent [19]

Takeda et al.

[11] 4,292,128

[45] Sep. 29, 1981

[54] BOILING WATER TYPE NUCLEAR REACTOR

[75] Inventors: Renzo Takeda, Hitachi; Kunitoshi Kurihara, Sagamihara; Sadao Uchikawa, Hitachi, all of Japan

[73] Assignee: Hitachi, Ltd., Tokyo, Japan

[21] Appl. No.: 942,558

[22] Filed: Sep. 15, 1978

[30] Foreign Application Priority Data

Sep. 16, 1977 [JP] Japan ................................ 52-110591

[51] Int. Cl.$^3$ .............................................. G21C 7/00
[52] U.S. Cl. ................................................. 176/20 R
[58] Field of Search ........................ 176/20 R, 54–56, 176/60

[56] References Cited

U.S. PATENT DOCUMENTS 3,386,886 6/1968 Whittier ............................. 176/20 R
3,400,048 9/1968 Boardman et al. ..................... 176/60

OTHER PUBLICATIONS

Nucleonics (12/55) pp. 42–45 Macphee How to Control a Boiling Water Reactor.

*Primary Examiner*—S. A. Cangialosi
*Attorney, Agent, or Firm*—Craig and Antonelli

[57] ABSTRACT

A boiling water type nuclear reactor adapted to be operated at a void quality (weight ratio of vapor in the coolant) of coolant at the core outlet of 17% or higher. By adopting this level of void quality, a void quality exceeding 8.5% is available at least in the upper half region of the core which in turn provides a void fraction of 66% or higher. Consequently, it is possible to reduce the enrichment of the fuel, so as to allow a more efficient use of the fuel. At the same time, due to the reduced power generating rate, the range over which the flow rate of coolant is controlled is widened, so that it becomes possible to change the reactivity solely by controlling the flow rate of the coolant. It is therefore possible to operate the reactor over whole operation cycle with its control rods fully withdrawn.

3 Claims, 10 Drawing Figures

FIG. 5
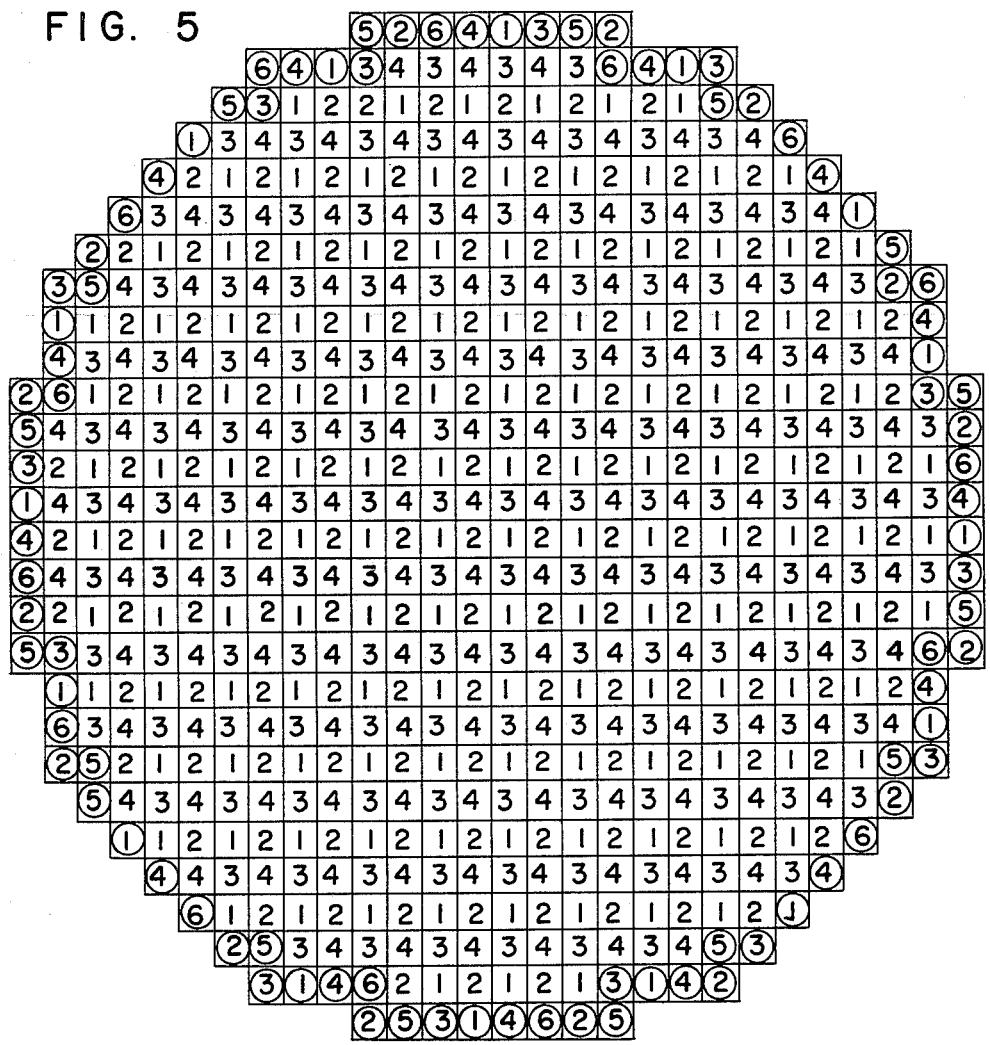
FIG. 6a
FIG. 6b
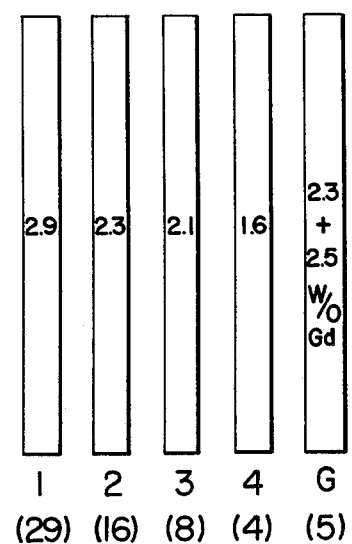

FIG. 7a
```
4 3 2 2 2 2 3 4
3 G 1 1 1 1 G 3
2 1 1 1 1 1 1 2
2 1 1 G W 1 1 2
2 1 1 W 1 1 1 2
2 1 1 1 1 1 1 2
3 G 1 1 1 1 G 3
4 3 2 2 2 2 3 4
```
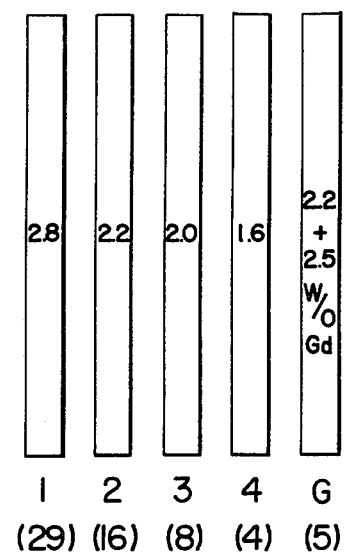
FIG. 7b
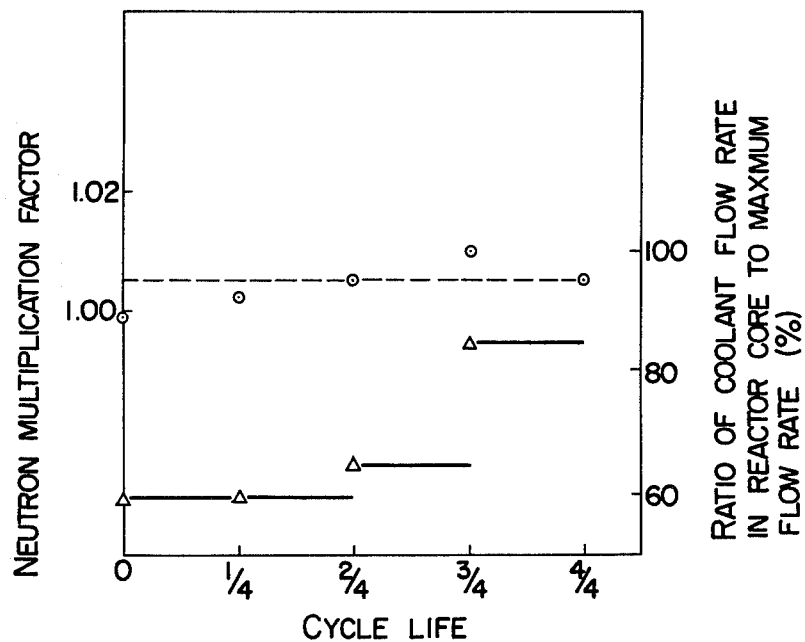
FIG. 8

BOILING WATER TYPE NUCLEAR REACTOR

BACKGROUND OF THE INVENTION

The present invention relates to a boiling water type nuclear reactor and, more particularly, to a core of this type of reactor.

The average ratio of weight of vapor to the total weight of the coolant (Referred to as void quality hereinafter) in the core of boiling water reactor during operation is usually 13 to 15%. The thermal condition of operation of the boiling water reactors is limited by various factors, typically including the maximum linear heat generating rate and the minimum critical power ratio (MCPR). According to the current method of design, the size of the reactor core is determined for a given power, such that the maximum linear heat generating rate is maintained at a level lower than 13.4 kw/ft. Then, the flow rate of the coolant flowing through the core is determined so as to provide such a value of the minimum critical power ratio as not to incur the burning out of the fuel rods. A void quality of 13 to 15% at the core outlet is automatically derived from this method of design and has been adopted in existing boiling water reactors.

SUMMARY OF THE INVENTION

It is an object of the invention to provide a boiling water reactor which can be operated with a high void quality, while the heat generating rate is maintained at a lower level than in the conventional reactors, so as to increase the level of mean energy of neutron, thereby to afford a more efficient use of the fuel through improving the conversion rate. At the same time, the control of the reactivity is changed as a rule solely by controlling the flow rate of the coolant through the reactor core, without relying upon the control rods. Such a control is possible because the range of the controllable range of flow rate is widened. This in turn offers various advantages such as simplification of the operation method, guarantee for the soundness of the fuel and improvement in the efficiency of operation of the plant.

The void quality (x) of the coolant at the core outlet of a boiling water reactor is given by the following equation (1).

$$x = \frac{hin + P/W - hf}{hfg} \qquad (1)$$

where, hin, hf, hfg, P and W represent, respectively, enthalpy of the coolant at the core inlet, enthalpy of water in the saturated state, latent heat of vapor, thermal power of the reactor core and the flow rate of the coolant.

From the equation (1) above, it will be seen that the enthalpy of the coolant at the core inlet, thermal power of the reactor core and the flow rate of the coolant can be used as the variable factors for changing the void quality at the core outlet.

A reference is made here to a boiling water reactor BWR-5 designed in accordance with the present design standard. This reactor has a heat generating rate of 50 KW/l, and a level of power per fuel assembly of 4.3 MW. The flow rate of the coolant per fuel assembly and the void quality at the core outlet are 63.6 t/h and 13.1%, respectively, while the mean void fraction across the core is about 43%. The minimum critical power ratio (MCPR) which limits the thermal condition is as low as about 1.35, when the reactor is operated under above started operating condition. The value of the minimum critical power ratio has a margin of about 0.1 to the level of the design standard which is 1.24.

Hereinafter, the description will be made on an assumption that the reactor is operated at an electric output of 800 MWe, by way of example. The number of the fuel assemblies, which is 560 according to the design standard, is increased up to 624. Consequently, the level of the power per fuel assembly is reduced to 3.9 MW. Provided that the flow rate of the coolant of the design standard, i.e. 63.6 t/h is maintained, the void quality at the outlet side of the fuel assembly and the mean void fraction across the core are reduced to 11.4% and 40%, respectively, while the value of the minimum critical power ratio (MCPR) is increased up to 1.5 or higher. Therefore, the flow rate of the coolant per fuel assembly is reduced to 38.2 t/h which amounts 60% of that of the design standard. Consequently, the void quality at the core outlet is increased from 11.4% to 21.1%.

FIG. 1 shows how the void fraction is changed by the change in the void quality. It will be seen from this Figure that no substantial change of the void fraction is caused, even when the void quality is changed largely, in the region of the quality above 10%. The increase of the mean void fraction across the core is as small as 16%, from 40% to 56%, in this region.

FIG. 2 shows the relationship between the infinite multiplication factor ($K\infty$) and the degree of burn-up of the fuel assembly with a parameter of the void fraction. More specifically, the relationships as observed when the void fraction is 0.0, 0.4 and 0.7 are shown at the full-line curve, one-dot-and-dash line curve and by the broken-line curve, respectively. The mean enrichment of the fuel assembly is 2.51 w/0. At the same time, there are used 5 (five) Gd rods, each of which contains gadlinea of a mean concentration of 2.5 w/0.

As the void fraction comes higher, the ratio of water to uranium is decreased resulting in an increased rate of absorption of neutron by the $^{238}U$. Consequently, the conversion ratio is increased to lower the infinite multiplication factor at regions of relatively small degree of burn-up. However, since there is an accumulation of plutonium as the burning of fuel goes on, the infinite multiplication factor comes to assume a level higher than that obtained by lower void fraction, as the degree of burn-up is increased beyond 20 GWd/st. This means that the mean enrichment of the fuel can be lowered to allow a more efficient use of the fuel, by adopting a higher void fraction, provided that the degree of burn-up of the fuel is high. It is therefore possible to improve the efficiency of use of the fuel in the central area of the core, where there are a number of fuel rods of high degrees of burn-up after repeated fuel replacement, through reducing the level of the mean enrichment of the fuel used in that area, by adopting a higher mean void fraction across the core.

Further, it is remarkable that the change of reactivity due to the burn-up can be adjusted solely by controlling the flow rate of the coolant, provided that the gadolinea, which is a typical burnable poison, is suitable combined with the fuel. Consequently, it is possible to maintain the normal running of the reactor over one year, with all control rods fully withdrawn.

FIG. 3 shows how the infinite multiplication factor ($K\infty$) of an imaginary gadolinea-containing fuel is changed as the time elapses. In this Figure, the infinite multiplication factor ($K_\infty$) exhibited by the fuel at the starting of use corresponds to a point designated at 1. Similarly, the infinite multiplication factors observed at the beginning of the second year, beginning of the third year and at the end of the fourth year correspond, respectively, to the points 2, 3 and 5. The peak of the infinite multiplication factor, which is observed at the point 2 represents the exhaustion of the gadolinea. The fuel is taken out of the core when the level of the infinite multiplication factor has come down to the level of the point 5, after four full years from the time of starting of the use. It is assumed here that the levels of the infinite multiplication factor at points 1 and 5 are equal to each other, and that the same factor is changed along a linear curve from the point 1 to the point 2 and from the point 2 to the point 5.

By composing four-batch dispersively loaded core making use of the fuel assemblies, if available, having the characteristic as shown in FIG. 3, the undesirable change of the reactivity due to the burning up can conveniently be avoided. Consequently, the reactivity control for the desired burning can be effected solely by changing the flow rate of the coolant, without operating the control rods at all, over the entire period of the operation cycle.

As a matter of fact, however, the power and the void fraction are not distributed uniformly over the entire area of the core. Therefore, the actual condition usually deviates from the ideal condition, to allow the gadolinea to remain locally in the fuel. To compensate for this, it becomes necessary to increase the enrichment of the uranium, which in turn lowers the efficiency of use of the fuel.

For these reasons, according to the conventional method of design, the concentration of gadolinea is selected to be somewhat smaller than that of the above-mentioned ideal condition, so that the multiplication factor of neutron in the core may be changed annually in a manner as shown in FIG. 4. Thus, it is a common controlling method to absorb the excess reactivity, which corresponds to the hatched area in FIG. 4, by means of the control rods.

In good contrast to the above, according to the invention, it is possible to control the reactivity solely by means of changing the flow rate of the coolant, with the control rods kept fully withdrawn. This entirely owes to the fact that the lowered heat generating rate affords a wide range of control of the flow rate, between 60% and 100% of the maximum flow rate, under the rated running condition.

According to the invention, it is essential that the void quality of the coolant at the core outlet is 17% or higher, for the following reason.

Assuming that the power per fuel assembly of 3.9 MW is adopted, the stated void quality of 17% is achieved by reducing the flow rate of coolant to 45.8 t/h, which amounts about 72% of 63.6 t/h adopted in the conventional reactor. By achieving the void quality exceeding 17% at the core outlet, a coolant void quality exceeding 8.5% is attained in at least the upper half region of the core. This void quality corresponds, as will be seen from FIG. 1, a void fraction of 66% or higher. Consequently, a burning of the fuel accompanied by a change in the multiplication factor following the broken line curve in FIG. 2, corresponding to the void fraction of 70%, is achieved at least in the upper half region of the core.

As has been explained, according to the invention, it is possible to carry out a normal operation over one year, with all control rods fully withdrawn. Conventionally, fuel rods have been obliged to sustain abrupt change of power at each time of the insertion and withdrwal of the control rods. However, according to the invention, the soundness of the fuel rods are guaranteed, because the insertion and withdrawal are eliminated. Further, the changing of the control rod pattern, which is indispensable for maintaining a uniform burn-up degree distribution and which requires to lower the level of power temporarily, can be dispensed with, so that the efficiency of use of the plant is improved considerably.

BRIEF DESCRIPTION OF THE DRAWINGS

FIG. 5 shows the construction of a reactor core, FIGS. 6a and 6b show the construction of a fuel assembly, FIGS. 7a and 7b show the construction of another fuel assembly, and FIG. 8 shows how the neutron multiplication factor and the flow rate of the core are changed in a cyclic life of one year.

DESCRIPTION OF THE PREFERRED EMBODIMENTS

Figure 1:
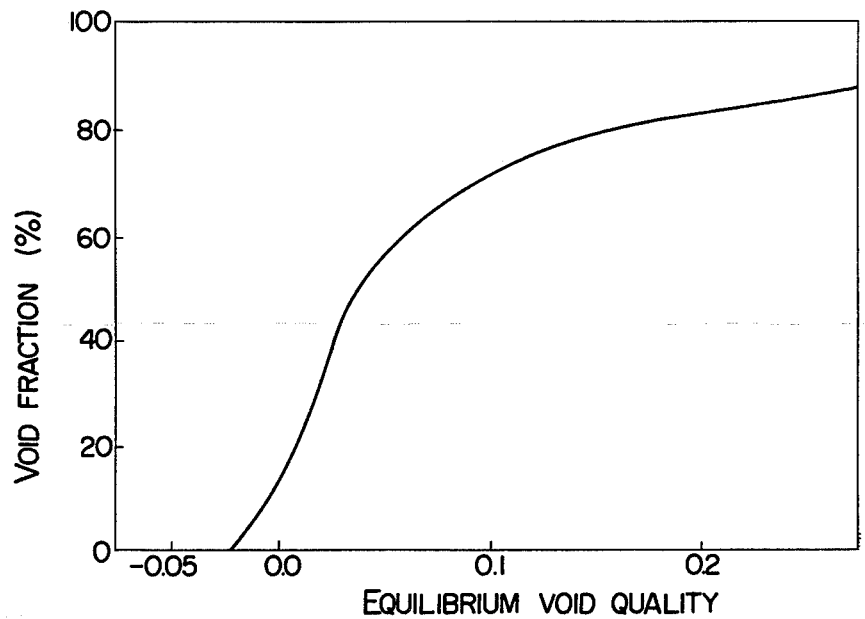
FIG. 1 shows how the void quality is changed in response to the change in the void fraction.
Figure 2:
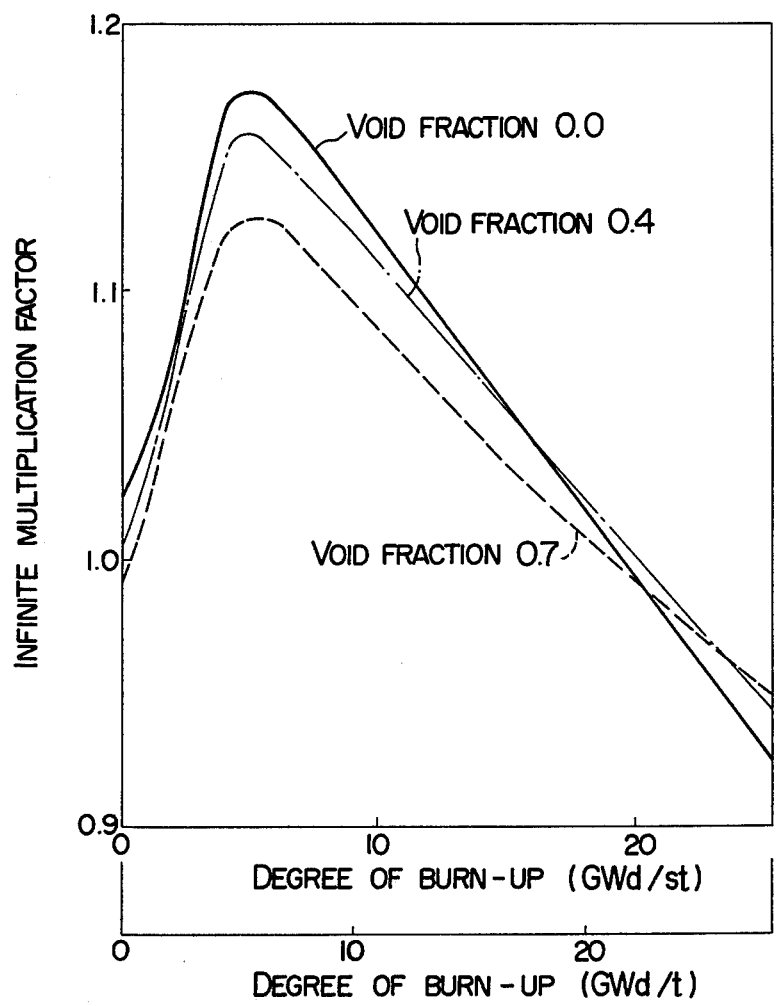
FIG. 2 shows the relationship between infinite multiplication factor and degree of burn-up of fuel, with a parameter of void fraction.
Figure 3:
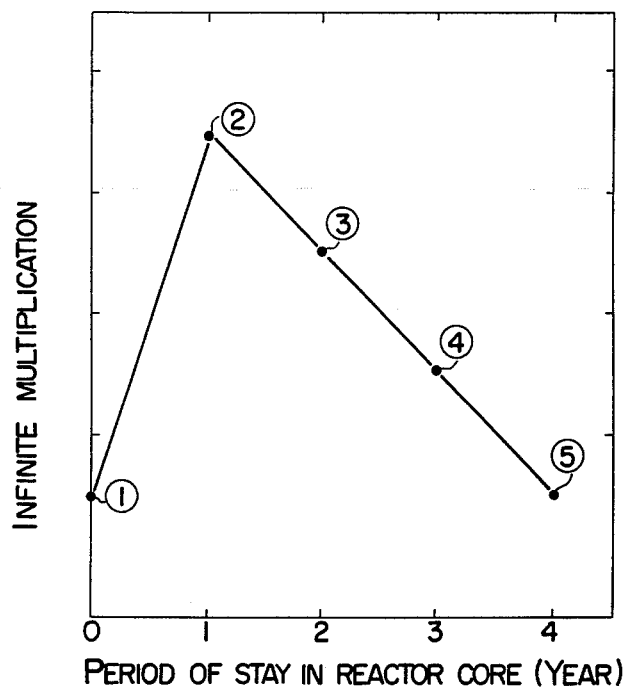
FIG. 3 shows the relationship between infinite multiplication factor and degree of burn-up of an imaginary fuel assembly.

The description of the preferred embodiment, which will be made hereinafter with reference to the accompanying drawings, refers to a reactor having a power of 800 MWe, by way of example.

Referring to FIG. 5 showing the construction of the reactor core, the core includes a number of fuel assemblies each of which is represented by a square or box. The fuel assemblies in the central region of the core are adapted to stay in the core for 4 (four) years, while the fuel assemblies disposed at the peripheral region of the core and having circular marks are adapted to be used over 6 (six) years. The numeral in each box represents the age of the fuel assembly, i.e. the years which have elapsed after the fuel assembly is installed in the core. In this reactor core, no shuffling of the fuel assemblies is conducted as a rule. Thus, the fuel assemblies occupies the same position over the entire period of their stays of 4 or 6 years in the reactor core.

FIG. 6 shows an example of the construction of a fuel assembly. More specifically, the left-hand side portion schematically shows the fuel assembly in cross-section, while the right-hand side portion of the same Figure illustrates various fuel rods constituting the fuel assembly. The numerals appearing in the cross-section as shown in the left-hand side portion of this Figure represents the kinds of the fuel rods as illustrated at the right-hand side portion. As will be seen the cross-sectional view, two water rods W are disposed at the center of the fuel assembly. The fuel rods having "G" marks contain gadolinea. The numerals in the fuel rods as illustrated at the right-hand side portion of FIG. 6 represent the enrichments of uranium of respective fuel rods. The mean enrichment of the fuel assembly constituted by these fuel rods is 2.51 w/0, while the concentration of gadolinea in each of 5 (five) gadolinea-containing rods is 2 w/0.

The result of an analysis in accordance with a three-dimensional nuclear heat water power claculation program shows that the neutron multiplication factor of the core in the equilibrium state is 1.005, at the end of operation cycle of one year, provided that the reactor has been operated at a heat generating rate of 45 kw/l, efficiency of use of plant of 75% and with the maximum flow rate of the coolant. This tells that the reactivity is just balanced. The mean degree of burn-up of the fuel taken out of the core is 25.400 MWd/t.

Referring now to the operation of the reactor with reduced flow rate of the coolant, it is assumed here that the reactor is operated with the flow rates which amounts 60%, 60%, 65% and 85% of the maximum flow rate, in the first, second, third and the last quarters of its operation cycle, respectively. The maximum flow rate of coolant is adopted at the final period of operation. In such a case, the neutron multiplication factor is 1.016, which is higher by about 1.1% ΔK/K then that obtained when the reactor is operated with the maximum flow rate of coolant over its whole operation cycle.

Generally speaking, the infinite multiplication factor of neutron of a fuel assembly is changed by about 1%, when the mean enrichment of the $^{235}$U of the fuel assembly is changed by 0.1%. Therefore, the safe reduction of the neutron multiplication factor in the core by 1.1% ΔK/K suggests that it is fairly possible to reduce the mean enrichment of the fuel assembly from 2.51 w/0 down to 2.4 w/0.

The reduction of enrichment of uranium by 0.1% in turn reduces the amount of the naturally available uranium required for producing 1 Kg of enriched uranium from 4.5 Kg to 4.3 Kg, and the level of enriching work is also reduced from 3.2 Kg SWU to 3.0 Kg SWU. Consequently, the cost of production of the enriched uranium is reduced by 5.2%, while the natural uranium resource is saved by 4.5%.

For information, the minimum critical power ratio (MCPR) of 1.3 or higher is maintained, even when the reactor is operated with the flow rate of coolant amounting 60% of the maximum flow rate. This fully meets the requirement of the present design standard in which the MCPR is limited to be 1.24 or higher.

Hereinafter, a description will be made as to how it is possible to control the reactivity solely by changing the flow rate of the coolant. FIG. 7 shows the construction of a fuel assembly having a mean enrichment of 2.42 w/0, while FIG. 8 shows the relationship between the neutron multiplication factor (Keff) and the degree of burn-up. In FIG. 8, double-circle marks represent the neutron multiplication factor. The flow rates as used in burn-up degree calculation and neutron multiplication factor calculation are represented by full lines and triangular marks, respectively.

Figure 4:
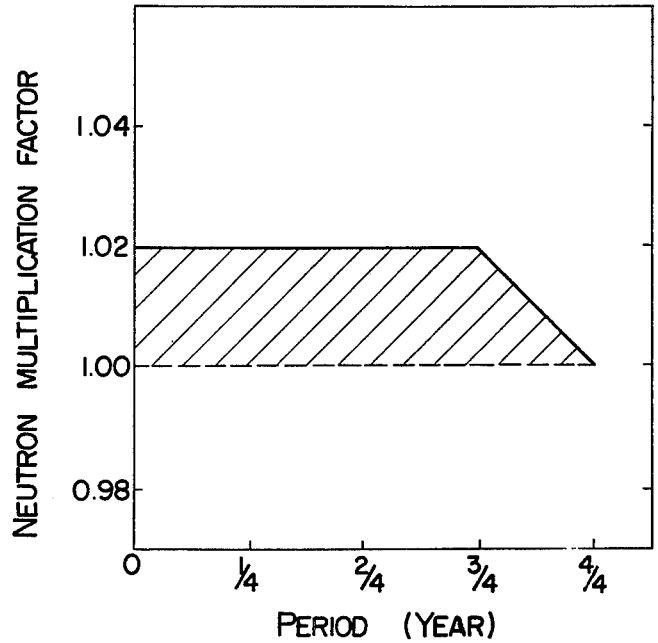
FIG. 4 shows how the neutron multiplication factor changes in a year, when the reactor is operated with the maximum flow rate of the coolant.

Flow rates of coolant as shown in FIG. 8 were adopted in respective quarters of the whole operation cycle of one year, throughout which the control rods have been kept fully withdrawn. It will be seen from FIG. 8 that the neutral multiplication factor Keff in each quarter of operation cycle falls within the range of 1.005±0.6% ΔK/K, i.e. within the range of ±0.6% ΔK/K around 1.005 which is the neutron multiplication factor as obtained in the reactor operation with the maximum coolant flow rate adopted over the entire operation cycle. This proves that it is fairly possible to obtain neutron multiplication factor of 1.005 at the end of the operation cycle, by an adequate fine control of the flow rate of the coolant. Thus, according to the invention, it is possible to design a fuel assembly which exhibits a characteristic as shown in FIG. 4, by an optimizing the enrichment of fuel, number of gadolinea-containing fuel rod and concentration of gadolinea.

Table 1 shows how the maximum linear heat generating rate and the minimum critical power ratio are changed as the degree of burn-up increases. It will be seen that the maximum linear heat generating rate and the minimum critical power ratio are maintained at levels below 10 Kw/ft and above 1.30, respectively, over the entire period of use of the fuel.

TABLE 1

| Degree of burn-up (MWd/t) | Ratio of flow rate of coolant to maximum flow rate (%) | Max. linear heat generating rate | | MCPR |
|---|---|---|---|---|
| | | (kw/m) | (kw/ft) | |
| 0 | 60 | 28.9 | 8.8 | 1.37 |
| 1510 | 60 | 30.8 | 9.4 | 1.34 |
| 3020 | 65 | 31.8 | 9.7 | 1.35 |
| 4861 | 85 | 28.2 | 8.6 | 1.57 |
| 6042 | 100 | 27.9 | 8.5 | 1.68 |

We claim:

1. A method of operating a boiling water nuclear reactor having a reactor core through which a water coolant is circulated, wherein said core is operated at a void quality (weight ratio of vapor in the coolant) of the coolant at the core outlet of between 17% and 50%.

2. A method according to claim 1, wherein said core is operated at a void quality of the coolant at the core outlet of between 17% and 27%.

3. A method according to claim 1, wherein said core is operated at a void quality of the coolant at the core outlet of 21%.

* * * * *